United States Patent
Bhatnagar et al.

(10) Patent No.: US 8,887,312 B2
(45) Date of Patent: Nov. 18, 2014

(54) HELMETS COMPRISING CERAMIC FOR PROTECTION AGAINST HIGH ENERGY FRAGMENTS AND RIFLE BULLETS

(75) Inventors: Ashok Bhatnagar, Richmond, VA (US);
Lori Wagner, Richmond, VA (US);
Bradley Grunden, Midlothian, VA (US)

(73) Assignee: Honeywell International, Inc., Morristown, NJ (US)

( * ) Notice: Subject to any disclaimer, the term of this patent is extended or adjusted under 35 U.S.C. 154(b) by 1270 days.

(21) Appl. No.: 12/604,381

(22) Filed: Oct. 22, 2009

(65) Prior Publication Data

US 2012/0186002 A1    Jul. 26, 2012

(51) Int. Cl.
| | |
|---|---|
| *F41H 1/02* | (2006.01) |
| *F41H 5/04* | (2006.01) |
| *F41H 1/08* | (2006.01) |
| *B32B 3/16* | (2006.01) |
| *A42B 3/06* | (2006.01) |
| *B32B 5/26* | (2006.01) |
| *C04B 37/00* | (2006.01) |
| *F41H 13/00* | (2006.01) |

(52) U.S. Cl.
CPC ........... *F41H 1/08* (2013.01); *B32B 2262/0253* (2013.01); *C04B 2237/365* (2013.01); *C04B 2237/38* (2013.01); *C04B 2237/76* (2013.01); *C04B 2237/343* (2013.01); *C04B 2237/704* (2013.01); *B32B 3/16* (2013.01); *A42B 3/063* (2013.01); *B32B 5/26* (2013.01); *C04B 2237/368* (2013.01); *B32B 2437/04* (2013.01); *B32B 2262/0269* (2013.01); *C04B 2237/78* (2013.01); *C04B 2237/36* (2013.01); *C04B 37/008* (2013.01); *Y10S 428/911* (2013.01)

USPC .................. 2/2.5; 2/410; 2/6.6; 2/6.8; 2/411; 89/36.05; 428/911

(58) Field of Classification Search
USPC ................ 2/2.5, 410, 6.6, 6.8, 411; 89/36.05; 428/911
See application file for complete search history.

(56) References Cited

U.S. PATENT DOCUMENTS

| | | | |
|---|---|---|---|
| 3,787,109 A * | 1/1974 | Vizenor | ......................... 359/631 |
| 3,871,026 A | 3/1975 | Dorre | |
| 4,737,402 A | 4/1988 | Harpell et al. | |

(Continued)

FOREIGN PATENT DOCUMENTS

| | | |
|---|---|---|
| CN | 2852760 | 1/2007 |
| DE | 4031550 A1 | 4/1992 |

(Continued)

OTHER PUBLICATIONS

Li, Quan-Lu et al., "Acoustical and vibrational control system combining piezoelectric ceramics and electrorheological fluids," Gongchen/Optics and Precision Engineering, v 16, n 12, p. 2341-2345, Chinese Academy of Sciences, Dec. 2008, ISSN: 1004924X CODEN: GJGOF4 [Abstract].

(Continued)

*Primary Examiner* — Bobby Muromoto, Jr.

(57) ABSTRACT

Helmets for military and other applications that require resistance to high energy fragments and rifle bullets are disclosed. The helmets are fabricated with a combination of ceramic, either as a monolith or as a plurality of discreet pieces, and an inner backing material having a plurality of fibrous layers such as polyolefin and/or aramid fiber layers.

20 Claims, 1 Drawing Sheet

(56) References Cited

U.S. PATENT DOCUMENTS

| | | |
|---|---|---|
| 5,160,776 A | 11/1992 | Li et al. |
| 5,254,383 A | 10/1993 | Harpell et al. |
| 5,330,820 A * | 7/1994 | Li et al. .................. 428/113 |
| 5,362,527 A | 11/1994 | Harpell et al. |
| 5,376,426 A | 12/1994 | Harpell et al. |
| 5,552,208 A * | 9/1996 | Lin et al. ................. 428/113 |
| 5,587,230 A * | 12/1996 | Lin et al. ................. 442/135 |
| 5,880,042 A | 3/1999 | Schuster et al. |
| 5,938,878 A * | 8/1999 | Hurley et al. ............. 156/219 |
| 5,996,115 A | 12/1999 | Mazelsky |
| 6,363,539 B2 | 4/2002 | Tachi et al. |
| 6,389,594 B1 | 5/2002 | Yavin |
| 6,532,857 B1 * | 3/2003 | Shih et al. ................ 89/36.02 |
| 6,642,159 B1 * | 11/2003 | Bhatnagar et al. ......... 442/134 |
| 7,067,031 B2 | 6/2006 | deWitt |
| 7,284,470 B2 | 10/2007 | Huber et al. |
| 7,300,893 B2 * | 11/2007 | Barsoum et al. ........... 442/134 |
| 7,363,846 B1 | 4/2008 | Dean et al. |
| 7,617,757 B2 | 11/2009 | Dickson |
| 7,685,922 B1 * | 3/2010 | Martin et al. ............. 89/36.02 |
| 7,687,412 B2 * | 3/2010 | Bhatnagar et al. ......... 442/135 |
| 7,919,418 B2 * | 4/2011 | Bhatnagar et al. ......... 442/135 |
| 8,124,548 B2 * | 2/2012 | Ardiff et al. ............. 442/135 |
| 8,132,494 B1 * | 3/2012 | Nguyen et al. ............ 89/36.05 |
| 2003/0192426 A1 | 10/2003 | Peretz |
| 2004/0121105 A1 * | 6/2004 | Janssen et al. ............ 428/40.1 |
| 2004/0255768 A1 | 12/2004 | Rettenbacher et al. |
| 2006/0248623 A1 | 11/2006 | Miller |
| 2006/0252328 A1 * | 11/2006 | Bingenheimer ............. 442/180 |
| 2006/0284338 A1 * | 12/2006 | Brown et al. ............. 264/258 |
| 2006/0286883 A1 * | 12/2006 | Brown et al. ............. 442/135 |
| 2007/0111621 A1 * | 5/2007 | Barsoum et al. ........... 442/135 |
| 2008/0064280 A1 * | 3/2008 | Bhatnagar et al. ......... 442/135 |
| 2008/0118639 A1 * | 5/2008 | Arvidson et al. .......... 427/175 |
| 2009/0014002 A1 * | 1/2009 | Krafthefer et al. ........ 128/205.18 |
| 2009/0025111 A1 * | 1/2009 | Bhatnagar et al. ......... 2/2.5 |
| 2009/0255037 A1 | 10/2009 | Sandusky et al. |
| 2010/0247856 A1 * | 9/2010 | Vito et al. ............... 428/138 |
| 2010/0275337 A1 * | 11/2010 | Bhatnagar et al. ......... 2/2.5 |
| 2012/0103503 A1 * | 5/2012 | Ardiff et al. ............. 156/182 |

FOREIGN PATENT DOCUMENTS

| | | |
|---|---|---|
| EP | 1288607 A1 | 3/2003 |
| EP | 1666830 | 6/2006 |
| GB | 2221976 A1 | 2/1990 |
| JP | 09-138097 | 5/1987 |
| JP | 11-050325 | 2/1999 |
| RU | 2133433 C1 | 7/1999 |
| WO | 2006005983 A2 | 1/2006 |
| WO | 2007144875 A1 | 12/2007 |
| WO | 2008054843 | 5/2008 |

OTHER PUBLICATIONS

Rosato, D.V., "RP and ceramics—Hard combination to beat," Plastics World, v 26, n 4, p. 30-35, Apr. 1968. [Best copy].

* cited by examiner

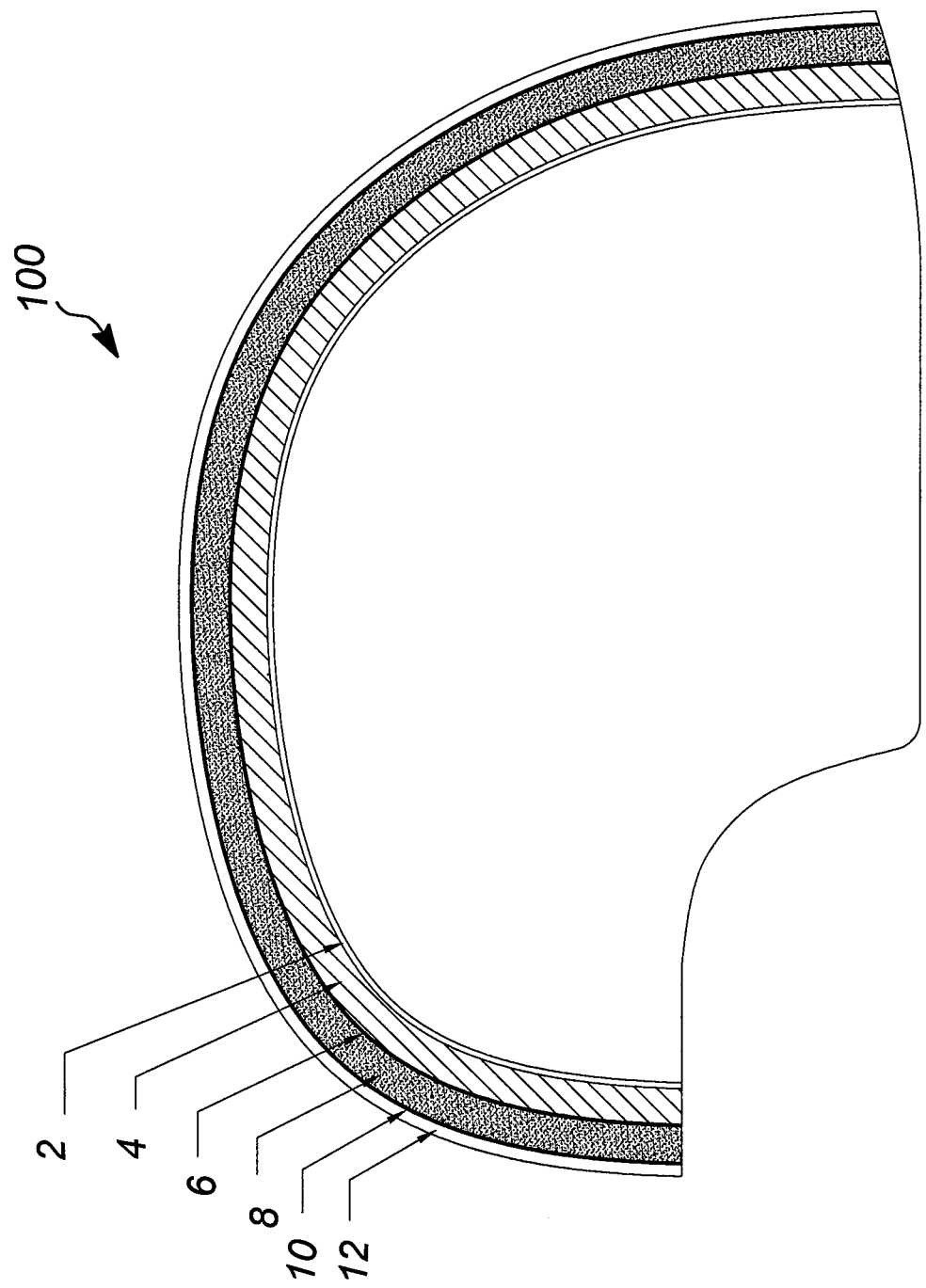

HELMETS COMPRISING CERAMIC FOR PROTECTION AGAINST HIGH ENERGY FRAGMENTS AND RIFLE BULLETS

FIELD OF THE INVENTION

The present invention relates to protective helmets which are useful for military, law enforcement and other applications. More particularly, the helmets provide protection against high energy projectiles including fragments, hand-gun bullets, and rifle bullets.

DESCRIPTION OF RELATED ART

Protective helmets are well known. Such helmets have been used for military and non-military applications. Examples of the latter include law enforcement uses, sporting uses, and other types of uses in which safety is a prime concern. Protective helmets used for military and law enforcement uses, in particular, need to be ballistic resistant.

Typical helmets are constructed to protect against low energy projectiles such as hand-gun bullets. The currently most popular military helmets, for example, are formed from aramid fibers, typically in the form of several layers of aramid fibers together with a resin material, such as a phenolic resin. Representative helmets formed of aramid fibers are disclosed, for example, in U.S. Pat. No. 4,199,388, U.S. Pat. No. 4,778,638 and U.S. Pat. No. 4,908,877. Protection against rifle bullets, however, requires improvement over such helmets in view of the significantly increased energy possessed by rifle bullets. Helmets which protect against rifle bullets should be relatively comfortable to wear. Examples of rifle bullets against which protection is desired include the NATO M80 ball, the AK 47, the AK 74, the Russian LPS, the European SS 109, and the like.

While currently used military and police ballistic helmets are suitable for low velocity fragments and low energy bullets such as hand-gun bullets, they do not provide enhanced protection against high energy fragments and rifle bullets. Examples of the former include fragments from hand grenades and projectile fragments from other explosive devices. Helmets designed to protect against projectile fragments (rather than rifle bullets) are described, for example, in copending U.S. patent application Ser. No. 11/706,719, filed Feb. 15, 2007.

There is a need in the art for helmets that can provide effective protection to military personnel and other users against high energy fragments and rifle bullets, thereby considerably enhancing their safety when confronted with dangerous and potentially life-threatening situations such as enemy fire.

SUMMARY OF THE INVENTION

The present invention is associated with the discovery of helmets that are resistant to high energy fragments and rifle bullets. More particularly, it has been found that the use of ceramic, for example disposed in a layer of the helmet shell and optionally in combination with other layers such as a fabric layer, can help provide this needed protection. Advantageously, helmets having the desired degree of resistance can be fabricated at commercially desirable overall thicknesses and weights.

Embodiments of the invention are therefore directed to helmets that effectively resist, or prevent the penetration of, high energy fragments and bullets. Representative helmets include a shell comprising from the outside to the inside (a) an outer layer comprising a ceramic and (b) an inner backing material comprising a plurality of fibrous layers. According to more particular embodiments, the ceramic and backing material are present in amounts, respectively, from about 30% to about 85%, and from about 10% to about 50%, by weight of the shell.

In other particular embodiments, the ceramic is in the form of a monolith, or single continuous piece, which conforms to a curved shape of the shell. In an alternative embodiment, the ceramic is in the form of a plurality of ceramic plates that conform to a curved shape of the shell, for example the plates may be non-planar and matched to the shapes of particular sectors or regions over which the helmet shell surface is divided. In the case of ceramic plates, these may be mechanically fitted with one another or otherwise chemically bonded (e.g., using a bonding agent such as glue or cement).

Generally, the fibrous layers of the inner backing material comprise high tenacity fibers in a resin matrix. According to particular embodiments, from about 2 to about 250 fibrous layers, and often from about 5 to about 150 fibrous layers, may be incorporated in the backing material. Representative high tenacity fibers of the fibrous layers comprise polyolefin fibers and aramid fibers. Combinations of different types of fibers and fabrics may be used. Any type of high tenacity fiber may be in a network which is in the form of a woven, knitted, or non-woven fabric. Representative resin matrices comprise both thermosetting and thermoplastics resins. Themosetting resins include epoxy resins, urethane resins, polyester resins, vinyl ester resins, and phenolic resins. Thermoplastic resins include isoprene-styrene-isoprene block copolymers, and thermoplastic polyurethanes. Hybrid resins comprising at least one thermosetting resin and at least one thermoplastic resin may also be employed.

According to other particular embodiments, the helmet shell may comprise additional layers, including a shock absorbing and/or moisture resistant material layer, which may be disposed outside the outer layer, for example as an exterior layer that is closer to the exterior surface of the helmet shell, relative to the outer layer comprising ceramic. This additional material layer may be, for example, a closed cell foam such as a vinyl nitrile (e.g., PVC nitrile), a polyethylene, or an ethylene vinyl acetate foam. One or more adhesive layers, for example first and second adhesive layers, may be disposed, respectively, between (i) the shock absorbing material layer and the outer layer comprising ceramic and (ii) this outer layer and the inner backing material.

In other particular embodiments, the shell has an areal density from about 0.5 lb/ft$^2$ (2.45 kg/m$^2$) to about 10 lb/ft$^2$ (48.9 kg/m$^2$), typically from about 3 lb/ft$^2$ (14.7 kg/m$^2$) to about 8 lb/ft$^2$ (39.2 kg/m$^2$), and often from about 3 lb/ft$^2$ (14.7 kg/m$^2$) to about 5 lb/ft$^2$ (24.5 kg/m$^2$) and is resistant to a rifle bullet having an energy of at least about 1600 J (1180 ft-lb), for example from about 1600 J (1180 ft-lb) to about 4000 J (2950 ft-lb).

Further embodiments of the invention are directed to methods for forming a shell for a helmet as discussed above. The methods comprise supplying, to a mold, (for example between opposing matched, male and female die sections of the mold) an outer layer comprising a ceramic and an inner backing material comprising a plurality of fibrous layers. Generally, the outer layer is disposed in a matched die mold such that it is closer to the surface of the female die section, relative to the inner backing material. This results in a helmet shell being formed with the outer layer comprising ceramic being closer, relative to an inner backing material, to the exterior surface of the helmet shell. Additionally, an adhesive layer may also be supplied to the mold between the outer layer and inner backing material. The methods further comprise applying heat and pressure to the outer layer, inner backing material, and adhesive layer (if used) to bond the ceramic to the inner backing material and form the shell. Therefore, The shell may therefore be formed by stacking the fibrous layers of the inner backing material onto the interior surface of the outer layer comprising a ceramic (e.g., as a ceramic monolith) and applying heat and/or pressure to consolidate or cure the backing material and adhere it to the outer layer. Appropriate conditions for consolidation or curing may be achieved in matched die molding or autoclave molding processes. A particular autoclave consolidation or curing technique employs vacuum bagging of the lay-up of the outer layer and inner backing material, optionally with adhesive and other layers, as described in greater detail herein. Vacuum bagging in an oven (i.e., without the application of above-atmospheric external pressure) may also be performed for consolidation or curing. Any type of process may be assisted using an adhesive layer such as cement between the inner backing material and outer layer, in order to bond these components. The use of adhesive such as contact cement in the absence of pressure, vacuum, and/or heating may also be sufficient in some cases.

In alternative embodiments, combinations of molding techniques are used. For example, the inner backing material may be molded separately in a matched die mold and then adhered to the outer layer comprising ceramic (e.g., as a shaped ceramic monolith or single piece) using an adhesive layer (e.g., contact cement) with or without the application of heat and/or pressure.

Further embodiments are directed to molded helmet shells prepared according to these methods.

These and other embodiments and aspects of the invention, and their associated advantages, are apparent from the following Detailed Description.

BRIEF DESCRIPTION OF THE DRAWING

FIG. 1 depicts a representative, cut-out view of a helmet shell according to an exemplary embodiment of the present invention.

The features of the helmet shell referred to in FIG. 1 are not necessarily drawn to scale and should be understood to present an illustration of the invention and/or principles involved. Other helmets according to the present invention will have configurations determined in part by the intended application and environment in which they are used.

DETAILED DESCRIPTION

As discussed above, the invention is associated with high energy fragment and bullet resistant helmets comprising ceramic, which may be backed with a layer of fiber-reinforced composite materials. Representative helmets according to the present invention therefore comprise a helmet shell, which refers to the rounded helmet portion defining an interior volume that is to be protected (and occupied by the user's head during use). The shell comprises an outer layer, meaning a layer that is disposed closer, relative to an inner backing material, to the exterior surface of the helmet shell. Conversely, the inner backing material is disposed closer, relative to the outer layer, to the interior, concave surface of the helmet shell facing its interior volume. The outer layer comprises a ceramic. Therefore, in view of the direction of travel of a high energy fragment or rifle bullet toward the helmet (e.g., from an enemy combatant), the outer layer comprising ceramic is impacted first, followed by the backing material.

Without being bound by theory, it is believed that the effectiveness of the inventive helmets results from the ability of the ceramic in the outer layer to defeat the incoming projectile, such as a rifle bullet, by blunting, shattering, deforming, stripping, and/or tumbling (turning) it, or otherwise breaking and/or destabilizing it. The inner backing material then acts as a support for the damaged ceramic (e.g., by maintaining it in place) and also continues to stop the projectile. This material can advantageously serve to catch or collect debris from both the projectile and broken ceramic, thereby preventing their further penetration.

The helmet shell may comprise further layers, for example a shock absorbing, moisture, and/or flame resistant material layer may be disposed outside of or closer to the exterior surface of the helmet shell, relative to the outer layer. Suitable representative materials that provide good shock absorption, moisture, and/or flame resistance include closed cell foams, which may be foamed vinyl nitrile (e.g., PVC nitrile), foamed polyethylene, or foamed EVA. The shock absorbing, moisture, and/or flame resistant material layer may be the outermost or exterior layer of the shell (i.e., the layer that is initially struck by a bullet or other projectile). One or more further layer(s) may be disposed between the shock absorbing, moisture, and/or flame resistant material layer and the outer layer. Alternatively, further layer(s) may be disposed outside of the shock absorbing, moisture, and/or flame resistant material layer. Such further layers may include, for example, materials that protect the ceramic from fractures during normal use or possibly misuse.

Adhesive layers may be included between any of the layers described above to improve compatibility/bonding of adjacent layers. For example, an adhesive layer may be incorporated between the outer layer comprising ceramic and the inner backing material. Otherwise, alone or in combination with this adhesive layer, another adhesive layer may be disposed between the shock absorbing and/or moisture resistant material layer discussed above and the outer layer comprising ceramic. The use of an adhesive layer between any adjacent pair functional layers described above is contemplated, as well as the use of multiple adhesive layers. Suitable adhesives include liquid, spray, or film adhesives comprising epoxies, polyurethanes, silicones, acrylics, or polyamides and also such specialty materials as anaerobics and cyanoacrylates. One and two component systems of each of these adhesive types are available commercially. Adhesives can cure at room temperature or upon exposure to heat.

According to one embodiment, the ceramic of the outer layer may be in the form of a monolith or single piece having the same or generally the same shape as the overall shape of the shell. However, because of the tendency for ceramic cracks to propagate to remote sections when struck by a fragment or bullet, a ceramic monolith may not always be optimal, especially for military personnel or other users who may be at risk of receiving multiple shots.

According to other embodiments, therefore, the damage to the ceramic from a single or multiple shots may be better confined or localized using a plurality of ceramic plates or tiles (e.g., two or more, typically from 2 to about 100, and often from about 5 to about 50) conforming, in combination, to the overall curved shape of the helmet shell. Therefore, the plates or tiles may match or correspond in shape to various sub-regions or sectors of the overall helmet shell, with some, all, or substantially all (e.g., typically at least about 50% and often at least about 80%) of the plates or tiles having a non-planar shape that allows them to better conform to the curvature of the shell.

Some or all of these plates or tiles may physically abut one another, for example such that the plates are mechanically joined or joined by using adhesive (e.g., a liquid adhesive) at a number of butt joints, for example along a straight line, between plate borders. Otherwise, the plates may be mechanically joined or fitted at their adjacent borders with some overlap (e.g., in a manner resembling puzzle pieces or using an overlapping joint such as a finger or dovetail joint). Butt joints or other types of joints may or may not be reinforced mechanically (e.g., with internal reinforcing agents such as metal dowels) or chemically (e.g., with an adhesive bonding agent such as glue or cement).

The fitting of the plates or tiles at their respective borders can therefore provide complete coverage, about the shell, with a ceramic in the same manner as discussed above with respect to the use of a ceramic monolith. According to other embodiments, only partial coverage of the helmet shell may be desired, for example in those areas around the crown of the helmet or lower, generally vertically oriented peripheral surface of the helmet (when worn), that is most likely to be impacted. Coverage of only a particular portion or portions of the helmet shell can, according to some embodiments, reduce the overall helmet weight and/or cost without significantly affecting the desired performance for most applications. Typically, the ceramic provides coverage over at least about 50%, and often at least about 80%, of the surface of the helmet shell.

The ceramic plates or tiles, or otherwise a ceramic monolith, as described herein, refer to pieces of solid material, or otherwise a single solid material, comprising ceramic. Ceramic refers to refractory materials including inorganic carbides, nitrides, oxides, and borides, with aluminum oxide, boron carbide, silicon carbide, silicon nitride, and titanium diboride being representative. Of these, aluminum oxide, boron carbide and silicon carbide are often employed. These materials may be reinforced (e.g., with internal fibers) or unreinforced. Solid non-fibrous materials having the ability to blunt, shatter, deform, strip, and/or tumble (turn), or otherwise break and/or destabilize a bullet or other projectile are also considered ceramic for purposes of this disclosure. Such materials include ceramic filled resins, metal pellet filled resins, glass bead filled resins, and similar composite materials. The ceramic plates or ceramic monolith may comprise all or substantially all ceramic. More generally, however, the ceramic plates or ceramic monolith may comprise at least about 50% by weight, typically at least about 70% by weight, and often at least about 85% by weight, of ceramic. The plates or monolith may therefore be composited with fibrous or non-fibrous materials that are not ceramics. An exemplary ceramic-rich composite, for example, is described in U.S. Pat. No. 7,104,177.

Plates or tiles comprising ceramic may have planar or otherwise non-planar (e.g., curved) surfaces corresponding to the shape of sub-regions or sectors of the overall helmet shell. Generally, all or some, for example at least 50% and often at least 85%, of the ceramic plates or tiles have a non-planar shape, particularly a curved shape conforming to or matching a section of the helmet shell. The two-dimensional shape (i.e., the general shape assumed if the non-planar shape were hypothetically pressed flat into a plane) of the plates or tiles may be rectangular (e.g., square), circular or oval shaped, polygonal, etc. Generally, shapes with straight borders such as polygons (e.g., squares or hexagons) are preferred for simplicity and ease of aligning adjacent borders of neighboring plates or tiles without gaps, thereby maximizing coverage. The widths or thicknesses of the plates, or width or thickness of the ceramic in a monolith form as discussed above, is generally in the range from about 2 mm (0.079 in) to about 12 mm (0.47 in), typically from about 3 mm (0.12 in) to about 10 mm (0.39 in), and often from about 4 mm (0.16 in) to about 6 mm (0.24 in). The ceramic, either as a monolith or as a plurality of plates will generally have a substantially uniform thickness in this range. However, it may be desired in particular embodiments to provide a greater width in more critical areas, such as the vertically oriented peripheral surface of the helmet as discussed above. This may be achieved by increasing the width of a ceramic monolith or plate in these areas, or otherwise by using ceramic plates having greater, but uniform, widths in these areas.

Thus, in accordance with the invention, the helmet shell is formed from layers comprising different ballistic materials, including an outer layer comprising ceramic and an inner backing material (or multiple materials) comprising fibrous layers. The inner backing material is disposed toward the interior of the helmet shell relative to the outer layer. The fibrous layers of the inner backing material may comprise any of a number of types of fibers or combinations materials as described herein. For example, mixtures of woven materials, mixtures of non-woven materials, and combinations of both woven and non-woven materials may be used.

For the purposes of the present invention, a fiber is an elongate body the length dimension of which is much greater that the transverse dimensions of width and thickness. Accordingly, the term fiber includes monofilament, multifilament, ribbon, strip, staple and other forms of chopped, cut or discontinuous fiber and the like having regular or irregular cross-section. The term "fiber" includes a plurality of any of the foregoing or a combination thereof. A yarn is a continuous strand comprised of many fibers or filaments.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material. Preferably, the high tenacity fibers have tenacities equal to or greater than about 10 g/d, more preferably equal to or greater than about 15 g/d, even more preferably equal to or greater than about 20 g/d, and most preferably equal to or greater than about 30 g/d. For high tenacity polyethylene fibers the preferred tenacities range from about 20 to about 55 g/d. Preferably, at least about 50% by weight, and more preferably at least about 75% by weight, of the fibers in the plurality of fibrous layers are high tenacity fibers. Most preferably all or substantially all of the fibers in the plurality of fibrous layers are high tenacity fibers.

The cross-sections of fibers useful in this invention may vary widely. They may be circular, flat or oblong in cross-section. They also may be of irregular or regular multi-lobal cross-section having one or more regular or irregular lobes projecting from the linear or longitudinal axis of the filament. It is particularly preferred that the fibers be of substantially circular, flat or oblong cross-section, most preferably that the fibers be of substantially circular cross-section.

The yarns of fibers such as high tenacity fibers used herein may be of any suitable denier, such as, for example, about 50 to about 5000 denier, more preferably from about 200 to about 5000 denier, still more preferably from about 650 to about 3000 denier, and most preferably from about 800 to about 1500 denier.

High tenacity fibers such as polyolefin fibers or aramid fibers are representative of those used in the fibrous layers of the inner backing material. Polyolefin fibers are preferably high tenacity polyethylene fibers and/or high tenacity polypropylene fibers. Most preferably, the polyolefin fibers are high tenacity polyethylene fibers, also known as extended chain polyethylene fibers or highly oriented high molecular weight polyethylene fibers. The polyolefin and aramid fibers useful herein are known and possess excellent ballistic resistant properties.

U.S. Pat. No. 4,457,985 generally discusses high molecular weight polyethylene fibers and polypropylene fibers, and the disclosure of this patent is hereby incorporated by reference to the extent that it is not inconsistent herewith. In the case of polyethylene fibers, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004, 699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding about 5 modifying units per 100 main chain carbon atoms, and that may also contain admixed therewith not more than about 50 weight percent of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers are commercially available and are sold under the trademark SPECTRA® fiber by Honeywell International Inc. of Morristown, N.J., U.S.A. Polyethylene fibers from other sources may also be used.

Depending upon the formation technique, the draw ratio and temperatures, and other conditions, a variety of properties can be imparted to these fibers. The tenacity of the polyethylene fibers is at least about 7 g/d, preferably at least about 15 g/d, more preferably at least about 30 g/d, still more preferably at least about 35 g/d and most preferably at least about 45 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,800 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. (280° F.). The highly oriented polyethylene filaments made of these materials have melting points of from about 7° C. (13° F.) to about 13° C. (23° F.) higher. Thus, a slight increase in melting point reflects the crystalline perfection and higher crystalline orientation of the filaments as compared to the bulk polymer.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, and more preferably at least about 200 g/d. The melting point of the polypropylene is generally raised several degrees by the orientation process, such that the polypropylene filament preferably has a main melting point of at least 168° C. (334° F.), more preferably at least 170° C. (338° F.). The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

In the case of aramid fibers, suitable fibers formed from aromatic polyamides are described in U.S. Pat. No. 3,671,542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 28 g/d, a modulus of at least about 1000 g/d and an energy-to-break of at least about 30 J/g. For example, poly(p-phenylene terephthalamide) filaments which have moderately high moduli and tenacity values are particularly useful in forming ballistic resistant composites. Examples are DuPont's Kevlar® 29, Kevlar® 129, and KM2 and Teijin's Twaron fibers type 1000 and 2000, Korean Kolon-Heracron fibers and a number of Russian fibers such as Rusar, Artec, Armos and SVM which has about 1250 g/d and 32 g/d as values of initial tensile modulus and tenacity, respectively. Other examples are Kevlar® 129 and KM2 which are available in 400, 640 and 840 deniers from du Pont, and Twaron® T2000 from Teijin which has a denier of 1000. Aramid fibers from other manufacturers can also be used in this invention. Copolymers of poly(p-phenylene terephthalamide) may also be used, such as co-poly(p-phenylene terephthalamide 3,4' oxydiphenylene terephthalamide). Also useful in the practice of this invention are poly(m-phenylene isophthalamide) fibers sold by du Pont under the trade name Nomex®. Aramid fibers from a variety of suppliers may be used in the present invention.

It is also possible that glass fibers or other types of fibers that are not high tenacity fibers account for the majority of the weight of fibers in the fibrous layers of the inner backing material, or for substantially all or all of the weight of these fibers. Glass fibers include Types E and S fibers. Examples of woven fiberglass fabrics are those designated as styles 1528, 3731, 3733, 7500, 7532, 7533, 7580, 7624, 7628, and 7645, which are available from Hexcel of Anderson, S.C., USA. A benefit of using fiber glass (e.g., by using fiberglass prepregs), is that the cost of the helmet can be decreased because fiberglass costs only a fraction of other types of fabrics such as polyolefin fabrics.

Regardless of the type of fibers used, the network of fibers in the fibrous layers of the inner backing material is preferably in the form of a woven, knitted or a non-woven fabric (such as plies of unidirectionally oriented fibers, or fibers which are felted in a random orientation), with a non-woven fabric being typically employed. Woven fabrics of any weave pattern may be employed, such as plain weave, basket weave, twill, satin, three dimensional woven fabrics, and any of their several variations. Plain weave fabrics are preferred and more preferred are plain weave fabrics having an equal warp and weft count.

In one embodiment, the fabric preferably has between about 5.9 to about 21.6 ends per cm (between about 15 and about 55 ends per inch) in both the warp and fill directions, and more preferably between about 6.7 to about 17.7 ends per cm (between about 17 and about 45 ends per inch). The yarns preferably have a denier of from about 375 to about 1300. The result is a woven fabric weighing preferably between about 150 g/m$^2$ and about 700 g/m$^2$ (between about 5 oz/yd$^2$ and about 19 oz/yd$^2$), and more preferably between about 169.5 g/m$^2$ to about 373.0 g/m$^2$ (between about 5 oz/yd$^2$ and about 11 oz/yd$^2$). Examples of such fabrics are those designated as SPECTRA® fabric styles 902, 903, 904, 952, 955 and 960. Other examples included fabrics formed from basket weaves, such as SPECTRA® fabric style 912. Examples of aramid fabric are those designated as Kevlar® fabric styles 704, 705, 706, 708, 710, 713, 720, 745, and 755 and Twaron® fabric styles 5704, 5716, and 5931. The foregoing fabrics are available, for example, from Hexcel of Anderson, S.C., USA. As those skilled in the art will appreciate, the fabric constructions described here are exemplary only and not intended to limit the invention.

As mentioned above, the fabric may be in the form of a knitted fabric. Knit structures are constructions composed of intermeshing loops, with the four major types being tricot, raschel, net and oriented structures. Due to the nature of the loop structure, knits of the first three categories do not necessarily take full advantage of the strength of a fiber. Oriented knitted structures, however, use straight inlaid yarns held in place by fine denier knitted stitches. The yarns are absolutely straight without the crimp effect found in woven fabrics due to the interlacing effect on the yarns. These laid in yarns can be oriented in a monoaxial, biaxial or multiaxial direction depending on the engineered requirements. It is preferred that the specific knit equipment used in laying in the load bearing yarns is such that the yarns are not pierced through.

Alternatively, the fabric of the plurality of fibrous layers (e.g., having high tenacity polyethylene fibers), may be in the form of a non-woven fabric, such as plies of unidirectionally oriented fibers, or fibers which are felted in a random orientation. Where unidirectionally oriented fibers are employed, preferably they are used in a cross-ply arrangement in which one layer of fibers extends in one direction and a second layer of fibers extends in a direction 90° from the first fibers. Where the individual plies are unidirectionally oriented fibers, the successive plies are preferably rotated relative to one another, for example at angles of 0°/90°, 0°/90/0°/90 or 0°/45°/90°/45°/0° or at other angles. Where the networks of fibers are in the form of a felt, they may be needle punched felts. A felt is a non-woven network of randomly oriented fibers, preferably at least one of which is a discontinuous fiber, preferably a staple fiber having a length ranging from about 0.64 cm (0.25 in) to about 25 cm (10 in). These felts may be formed by several techniques known in the art, such as by carding or fluid laying, melt blowing and spin laying. The network of fibers is consolidated mechanically such as by needle punching, stitch-bonding, hydro-entanglement, air entanglement, spun bond, spun lace or the like, chemically such as with an adhesive, or thermally with a fiber to point bond or a blended fiber with a lower melting point. The preferred consolidation method is needle punching alone or followed by one of the other methods. The preferred felt is a needle punched felt. A felt that is needle punched into woven fabric may also be used.

The fibrous layers comprise fibers (e.g., high tenacity polyethylene fibers or high tenacity aramid fibers) that are in a resin matrix. The resin matrix for the fiber plies may be formed from a wide variety of elastomeric and other materials having desired characteristics. In one embodiment, elastomeric materials used in such matrix possess initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomeric material has initial tensile modulus equal to or less than about 1,200 psi (8.23 MPa). These resinous materials are typically thermoplastic in nature but thermosetting materials are also useful.

The resin matrix may be selected to have a high tensile modulus when cured, such as at least bout 1×10$^6$ psi (6895 MPa) as measured by ASTM D638. Examples of such materials are disclosed, for example, in U.S. Pat. No. 6,642,159, the disclosure of which is expressly incorporated herein by reference to the extent not inconsistent herewith.

The proportion of the resin matrix material to fiber in the fibrous layers may vary widely depending upon the end use. The resin matrix material preferably comprises about 0 percent (i.e., no resin) to about 98 percent by weight, more preferably from about 5 to about 95 percent by weight, still more preferably from about 10 to about 40 percent by weight, and most preferably from about 15 to about 25 percent by weight, of the total weight of the fibers and resin matrix of the inner backing material. The above percentages are based on the consolidated fabrics.

A wide variety of resins may be utilized in the resin matrix, including thermoplastic resins, thermosetting resins, blended resins, and hybrid resins. For example, any of the following materials may be employed: polybutadiene, polyisoprene, natural rubber, ethylene-propylene copolymers, ethylene-propylene-diene terpolymers, polysulfide polymers, thermoplastic polyurethanes, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, and copolymers of ethylene. Examples of thermosetting resins include those which are soluble in carbon-carbon saturated solvents such as methyl ethyl ketone, acetone, ethanol, methanol, isopropyl alcohol, cyclohexane, ethyl acetone, and combinations thereof. Among the thermosetting resins are vinyl esters, styrene-butadiene block copolymers, diallyl phthalate, phenolic resins such as phenol formaldehyde, polyvinyl butyral, epoxy resins, polyester resins, polyurethane resins, and mixtures thereof, and the like. Included are those resins that are disclosed in the aforementioned U.S. Pat. No. 6,642,159. Preferred thermosetting resins include epoxy resins, phenolic resins, vinyl ester resins, urethane resins and polyester resins, and mixtures thereof. Preferred thermosetting resins for polyethylene fiber fabrics include at least one vinyl ester, diallyl phthalate, and optionally a catalyst for curing the vinyl ester resin.

One preferred group of resins are thermoplastic polyurethane resins. A preferred group of elastomeric materials for the resin matrix includes block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type $R-(BA)_x$ (x=3-150); wherein A is a block from a polyvinyl aromatic monomer and B is a block from a conjugated diene elastomer. A preferred resin matrix is an isoprene-styrene-isoprene block copolymer, such as Kraton® D1107 isoprene-styrene-isoprene block copolymer available from Kraton Polymer LLC. Another resin matrix useful herein is a thermoplastic polyurethane, such as a copolymer mix of polyurethane resins in water.

The resin material may be compounded with fillers such as carbon black, silica, etc. and may be extended with oils and vulcanized by sulfur, peroxide, metal oxide or radiation cure systems using methods well known to rubber technologists. Blends of different resins may also be used.

Preferably, each of the plurality of fibrous layers is coated or impregnated with the resin matrix prior to molding, so as to form prepreg fabrics. In general, the fibrous layers of the invention are preferably formed by constructing a fiber network initially (e.g., starting with a woven fabric layer) and then coating the network with the matrix composition. As used herein, the term "coating" is used in a broad sense to describe a fiber network wherein the individual fibers either have a continuous layer of the matrix composition surrounding the fibers or a discontinuous layer of the matrix composition on the surfaced of the fibers. In the former case, it can be said that the fibers are fully embedded in the matrix composition. The terms coating and impregnating are interchangeably used herein. Although it is possible to apply the resin matrix to resin-free fibrous layers while in the mold, this is less desirable since the uniformity of the resin coating may be difficult to control.

The matrix resin composition may be applied in any suitable manner, such as a solution, dispersion or emulsion, onto the fibrous layers. The matrix-coated fiber network is then dried. The solution, dispersion or emulsion of the matrix resin may be sprayed onto the filaments. Alternatively, the fibrous layer structure may be coated with the aqueous solution, dispersion or emulsion by dipping or by means of a roll coater or the like. After coating, the coated fibrous layer may then be passed through an oven for drying in which the coated fiber network layer or layers are subjected to sufficient heat to evaporate the water or other liquid in the matrix composition. The coated fibrous network may then be placed on a carrier web, which can be a paper or a film substrate, or the fabrics may initially be placed on a carrier web before coating with the matrix resin. The substrate and the resin matrix containing fabric layer or layers can then be wound up into a continuous roll in a known manner.

The fiber networks can be constructed via a variety of methods. In the case of unidirectionally aligned fiber networks, yarn bundles of the high tenacity filaments may be supplied from a creel and led through guides and one or more spreader bars into a collimating comb prior to coating with the matrix material. The collimating comb aligns the filaments coplanarly and in a substantially unidirectional fashion.

Following coating of the fabric layers with the resin matrix, the layers are preferably consolidated in a known manner to form a prepreg. By "consolidating" is meant that the matrix material and the fiber network layer are combined into a single unitary layer. Consolidation can occur via drying, cooling, heating, pressure or a combination thereof.

The number of fibrous layers of the inner backing material may vary widely, depending on the type of helmet desired, the desired performance, and the desired weight. For example, the number of layers may range from about 2 to about 250 layers, more preferably from about 5 to about 150 layers, and most preferably from about 10 to about 100 layers. The layers may be of any suitable thickness. For example, each layer of the plurality of fibrous layers may have a thickness of from about 25 μm to about 1016 μm (about 1 mil to about 40 mils), more preferably from about 76 μm to 762 μm (about 3 to about 30 mils), and most preferably from about 127 μm to 508 μm (about 5 to about 20 mils). The thickness of each layer of the plurality of fibrous layers may be the same or may vary.

Likewise, the weights of each layer of the plurality of fibrous layers of the inner backing material may vary widely but these are usually chosen so that the overall weight of the helmet is within an acceptable range for both the comfort and protection of the wearer. For example, the weight of each layer may range from about 5 to about 200 grams, more preferably from about 10 to about 100 grams, and most preferably from about 20 to about 75 grams. Similarly, the areal density of each layer in the plurality of fibrous layers may vary widely but is usually also chosen to obtain a desirable mix of weight, comfort, and protection qualities. For example, the areal density of each layer preferably may range from about 33.9 $g/m^2$ to about 3051 $g/m^2$ (about 1 $oz/yd^2$ to about 90 $oz/yd^2$) about 169.5 $g/m^2$ to about 2203.5 $g/m^2$ (about 5 $oz/yd^2$ to about 65 $oz/yd^2$), and more preferably from about 169.5 $g/m^2$ to about 847.5 $g/m^2$ (about 5 $oz/yd^2$ to about 25 $oz/yd^2$). The thicknesses and areal densities of each of the fibrous layers of the inner backing material may be the same or different.

The weight ratio of the outer layer comprising ceramic and the inner backing material may vary as desired. The outer ceramic-containing layer may be present in an amount of from about 20% to about 90% by weight, based on the total weight of the helmet shell, more preferably from about 30% to about 85% by weight, and most preferably from about 45% to about 70% by weight. Correspondingly, the inner backing material may be present in an amount of from about 5% to about 80% by weight, based on the total weight of the helmet shell, more preferably from about 10% to about 50% by weight, and most preferably from about 35% to about 45% by weight.

The total areal density of the shell may likewise vary widely depending on the specific intended application. Typically, however, the shell areal density is less than about 48.9 $kg/m^2$ (10 $lb/ft^2$) and may be in the range from about 14.7 $kg/m^2$ (3 $lb/ft^2$) to about 48.9 $kg/m^2$ (10 $lb/ft^2$). Preferably, the total areal density of the helmet shells ranges from about 14.7 $kg/m^2$ (3 $lb/ft^2$) to about 24.4 $kg/m^2$ (5 $lb/ft^2$).

Some of the USA military helmets that have been widely employed in military applications are known by the acronyms PASGT (Personnel Armor System for Ground Troops), MICH (Mission Integrated Combat helmet), ACH (Advanced Combat Helmet), and ECH (Enhanced Combat Helmet). Preferred helmet shapes can vary by country. For example, countries in Europe, Asia, and South America tend to have different, preferred shapes. Desirably, such medium helmets have a weight in the range of from about 750 to about 1500 grams, and more preferably from about 800 to about 1100 grams.

To form the helmet shells of this invention, the ceramic (either as a monolith or as multiple pieces or tiles) of the outer layer, together with prepregs of the two or more types of fibrous layers of the inner backing material, are applied to a mold. For example, after supplying the outer layer comprising ceramic to a suitable mold, the desired number of the individual fibrous layers of the inner backing material (e.g., comprising polyolefin or aramid fibers) in a resin matrix is subsequently placed into the mold in a position to form the inner backing material. The mold may be of any desired type, such as a matched die mold having opposing, male and female matched die sections, whereby the outer layer comprising ceramic is placed initially in contact with the female matched die section, followed by the fibrous layers of the inner backing material. The order of placement may be reversed depending on the desired, relative positions of the helmet shell components. Desirably, the resin of the resin matrix is chosen so that it is non-tacky when placed into the mold. This permits the individual layers to slide over each other in order to completely fill the mold and form the desired helmet shape. No adhesive is required to be used between the individual fibrous layers, as the resin or resins of the individual layers generally provides the needed bonding between the layers. However, a separate adhesive layer or multiple layers may be used if desired.

Care should be taken to completely and uniformly fill the mold and place all of the helmet shell components in the proper orientation. This ensures uniform performance throughout the helmet shell. If the combined volume of the components is more than the helmet mold can handle, the mold will not close and hence the helmet will not be molded. If the combined volume is less than the volume of the mold, although the mold will close the material will not be molded due to lack of molding pressure.

Once the mold is properly loaded with the desired amount of ceramic, desired number and type of fibrous layers and resin matrix of the inner material layer, and optional other components, the helmet shell can be molded under the desired molding conditions. A representative molding temperature may range from about 65° C. (149° F.) to about 250° C. (482° F.), more preferably from about 90° C. (194° F.) to about 330° C. (626° F.), and most preferably from about 120° C. (248° F.) to about 320° C. (608° F.). The clamp molding pressure may range, for example, from about 10.2 metric tons to about 1020 metric tons (from about 10 tons to about 1000 tons), preferably from about 50.8 metric tons to about 356 metric tons (from about 50 tons to about 350 tons), and most preferably from about 102 metric tons to about 306 metric tons (from about 100 tons to about 300 tons). The molding times may range from about 5 to about 60 minutes, more preferably from about 10 to about 35 minutes, and most preferably from about 15 to about 25 minutes.

Under the desired conditions of molding, the resin or resins present in the fibrous networks are consolidated for thermoplastic resins and cured in the case of thermosetting resins. This results in strong bonding of the individual layers and groups of layers into the desired helmet shape as an integral, monolithic molding. It is believed that the thermosetting resins of each set of fabrics are bonded at their interfaces by cross-linking of the resins. For thermoplastic resins the helmet is cooled down below the softening temperature of the resin and then pulled out from the mold. Under heat and pressure, the thermoplastic resins flow between the fabric layers, also resulting in an integral, monolithic molding. During cooling the molding pressure is maintained. The molded product is thereafter taken from the mold and the part is trimmed, if necessary.

In an alternative molding process, the lay-up of the outer layer comprising ceramic and the fibrous layers of the backing material, optionally with adhesive and/or other material layers as described herein, may be placed in an autoclave. Heat and/or pressure may accompany autoclave molding, with representative temperatures in the ranges as discussed above with respect to die molding and representative absolute pressures typically in the range from about 5 bar (73 psi) to about 30 bar (435 psi). Pressurization, for example using one or more inert gases such as helium or nitrogen, generally promotes higher densities. Additional external pressurization of up to one atmosphere can be supplied by vacuum bagging of the layers. Using this technique, a bleedoff assembly to adjust vacuum pressure within the bag and a release cloth or coating to prevent bonding of the lay-up to the tool surface are usually employed. The use of external pressure, optionally combined with vacuum bagging, can provide a number of beneficial functions including inducing pliability to alleviate surface imperfections, removing volatile materials, eliminating trapped air between layers, compacting fiber layers for efficient force transmission among fiber bundles, preventing shifting of fiber orientation during cure or consolidation, and/or reducing humidity.

In a representative autoclave molding process, therefore, fibrous layers of the backing material are first positioned within an outer layer comprising ceramic, which may be in the form of a monolith having the shape of the helmet shell. Careful assembly of the fibrous layers can help minimize overlap between layers. The ceramic and backing material is placed in a vacuum bag and the environment surrounding the lay-up is partially or nearly completely evacuated. When sufficient vacuum is created and maintained within the bag, it is disconnected from the vacuum pump and transferred to the autoclave for consolidation or curing as discussed above. The same techniques may be used when the ceramic is in the form of a plurality of plates or tiles, as described herein, that are bonded mechanically and/or chemically (e.g., with an adhesive).

According to other methods of making helmet shells described herein, elevated temperature alone (e.g., in an oven) may be used to bond the outer layer comprising ceramic with the inner backing material. Oven heating may be used with vacuum bagging to provide heat, together with up to one atmosphere of external pressure. Otherwise, an adhesive such as contact cement, with or without external heating, may provide sufficient bonding for forming the helmet shell. Combinations of methods may also be used. For example, according to a representative method, the fibrous layers of backing material may be consolidated or cured initially in a matched die mold as discussed above. This backing material, now having the shape of the helmet shell, can then be coated with an adhesive layer on its exterior surface, followed by assembly of the inner backing material with the outer layer comprising ceramic. The lay-up may be transferred to a vacuum bag, as described above, prior to the application of heat in an oven or the application and heat and additional pressure in an autoclave, thereby effecting the consolidation or curing (e.g., of a thermosetting resin matrix).

The fabrics used in the individual fibrous layers of the inner backing material are generally relatively thin yet very strong. The preferred thicknesses of the individual layers are from about 25 μm to about 911 μm (about 1 to about 36 mils), more preferably from about 127 μm to about 711 μm (about 5 to about 28 mils), and most preferably from about 254 μm to 584 μm (about 10 to about 23 mils).

As mentioned above, the shells of helmets as described herein are resistant to, or capable of preventing penetration of, high energy fragments and bullets such as rifle bullets. Such fragments and bullets have very high energy levels. The helmets of this invention are capable of preventing penetration by fragments and bullets that have energy levels of at least about 1600 joules (1180 ft-lb), more preferably from about 1600 (1180 ft-lb) to about 4000 joules (2950 ft-lb), and most preferably from about 1700 joules (1250 ft-lb) to about 3000 joules (2200 ft-lb). Accordingly, aspects of the invention are associated with the discovery that ceramic can be employed in helmets to provide this level of penetration resistance using commercially feasible overall helmet thicknesses and weights. For example, effective protection may be provided for helmets with ceramic having a thickness, whether employed in monolith form or in the form of multiple pieces, in the range from about 4 mm (0.16 in) to about 6 mm (0.24 in), as discussed above. The total helmet shell thickness is advantageously less than about 18 mm (0.71 in) (e.g., in the range from about 6 mm (0.24 in) to about 18 mm (0.71 in)), normally less than about 14 mm (0.55 in) (e.g., in the range from about 8 mm (0.31 in) to about 14 mm (0.55 in)), and often less than about 12 mm (e.g., in the range from about 10 mm (0.39 in) to about 12 mm (0.47 in)). The total areal density of the helmet shell is advantageously less than about 8 lb/ft$^2$ (39.2 kg/m$^2$) (e.g., in the range from about 3 lb/ft$^2$ (14.7 kg/m$^2$) to about 8 lb/ft$^2$ (39.2 kg/m$^2$), as discussed above), and often less than about 5 lb/ft$^2$ (24.5 kg/m$^2$) (e.g., in the range from about 3 lb/ft$^2$ (14.7 kg/m$^2$) to about 5 lb/ft$^2$ (24.5 kg/m$^2$), as discussed above).

The following is a list of various bullets and their energy levels, with the velocities and energy measured at the muzzle. It can be seen that the rifle bullets have much higher energy levels than handgun bullets, and are thus more difficult to stop from penetrating helmets.

TABLE 1

Kinetic Energy of Bullets

| Bullet | Mass, grain (g) | Velocity, mps | Energy, Joules |
|---|---|---|---|
| 9 MM FMJ | 124 (g) | 373 ± 10 | 537 |
| 357 | 158 (9.5 g) | 440 ± 10 | 958 |
| 44 Mag | 240 (15 g) | 441 ± 10 | 1510 |
| AK 47 | 128 (8 g) | 900 ± 10 | 1960 |
| NATO (M80) | (9.5 g) | 810 ± 10 | 3000 |
| AK74 | (3.4 g) | 750 ± 10 | 1700 |
| LPS | 179 (11.6 g) | 804 ± 10 | 3814 |

The helmet structure, comprising a helmet shell as described herein, can be adapted to receive a variety of attachments as desired. For example, the helmet may be formed with grooves or built in channels to facilitate attachment of desired gear.

A representative helmet shell is depicted in FIG. 1. As shown in this embodiment, helmet shell 100 comprises six materials. Interior and exterior layers 2, 12 may be shock absorbing material layers (e.g., comprising a closed cell foam) or material layers that provide other protective functions such as moisture and/or flame resistance, alone or in combination with shock resistance. The outer layer 8 comprising ceramic (e.g., as a monolith or in the form of a number of discreet plates) is disposed closer to the helmet shell exterior than inner backing material 4, comprising a plurality of fibrous layers. Adhesive layers 6, 10 are shown between inner backing material 4 and outer layer 8 and also between this outer layer 8 and exterior layer 12.

Overall aspects of the present invention are associated with high energy fragment and bullet resistant helmets comprising an outer layer containing ceramic and an inner backing material comprising fibrous layers. Those having skill in the art, with the knowledge gained from the present disclosure, will recognize that various changes can be made in these helmets and methods of their manufacture without departing from the scope of the present disclosure. The subject matter described herein is therefore representative of the present invention and its associated advantages and is not to be construed as limiting the scope of the invention as set forth in the appended claims.

The following examples are set forth as representative of the present invention. These examples are not to be construed as limiting the scope of the invention as these and other equivalent embodiments will be apparent in view of the present disclosure and appended claims.

EXAMPLE 1

A helmet shell was molded using a matched metal die mold, designed to mold medium-sized ACH helmet shaped parts at 7.87 mm (0.310 in) wall thickness. Layers of Spectra Shield® II SR-3124 materials were cut from a 1.6 meter (63 in) wide rolls. A pin-wheel pattern was utilized. Each pin-wheel pattern was designed in such a manner that it completely covered the male mold. A total of 28 layers of pin-wheel were pre-formed in a bottomless bucket, and, at the same time, mold heating was started. Once the mold reached a temperature of 125±5° C. (257±9° F.) a coat of mold release was applied on the male and female parts of the mold. The pre-formed layers of Spectra Shield® II SR-3124 were then transferred to the mold. Care was taken that there were no folds or creases generated on the pre-form during transferring to the mold. A 190 Ton gauge pressure was applied for 20 minutes. After 20 minutes, the cooling cycle was started. During cooling cycle molding pressure was not removed. Once the mold cooled to about 35° C. (77° F.), the mold was opened and molded shell was removed.

At 24 hours after molding, the molded helmet was covered with an adhesive film and dropped inside a monolithic ACH shaped ceramic helmet shell matching the outer shape of the molded helmet shell. The ceramic with adhesive layer and pre-molded helmet shell were transferred into an autoclave bag having an opening on one side only. Finally, the open side was sealed and a vacuum was generated inside the bag using a portable vacuum pump. Once the vacuum pump stopped, confirming that full vacuum was achieved, the bag was transferred to an autoclave. The door of autoclave was closed and a molding pressure of 10 bar (145 psi) was applied on the bag. Immediately after applying pressure, autoclave heat was switched on to reach a temperature of 125±5° C. (257±9° F.). This temperature was maintained for 45 minutes so that adhesive was fully cured. After 45 minutes, a cooling cycle was started. Once autoclave temperature indicated 35° C. (77° F.), pressure was released and door of autoclave was opened. The bag containing ceramic helmet with backing material was pulled out. The helmet was removed and moved to a ballistic lab for at least 24 hours conditioning before testing.

Testing Protocol:

After clamping the helmet, having a total thickness of about 12 mm (0.47 in) in a fixture holding the helmet from two ear sections, testing was conducted according to MIL-STD-662F, using M-855 NATO bullet weighing 62 grains. Four bullets were fired at four equal quadrants of the ceramic faced helmets (front, back and two sides). The velocity of bullets was varied to achieved a 2×2 (two bullets penetrated and two bullets stopped on the helmet), A V50 of 905 meters per second (2968 feet per second) was achieved on an ACH ceramic faced helmet weighing 5.05 lbs.

EXAMPLE 2

Another ceramic helmet was fabricated in the manner similar to that described in Example 1 and tested against an AK 47 bullet. A V50 of 614 meters per second (2013 feet per second) was achieved on a medium ACH ceramic faced helmet weighing 5.36 lbs.

The invention claimed is:

1. A helmet that is resistant to high energy fragments and bullets, the helmet including a rounded shell, said shell comprising a crown and a peripheral surface which define an interior volume, and said rounded shell comprising from the outside to the inside:
   (a) an outer layer comprising a ceramic, wherein the ceramic is in the form of a continuous monolith that conforms to a curved shape of the rounded shell; and
   (b) an inner backing material comprising a plurality of fibrous layers;
   wherein the fibrous layers comprise high tenacity fibers in a resin matrix, and
   wherein the inner backing material comprises a fabric having both warp and fill directions, said fabric having about 5.9 to about 21.6 fiber ends per cm in both said warp and fill directions.

2. The helmet of claim 1, wherein the outer layer consists of an unreinforced, all ceramic component, where said ceramic consists of a compound selected from the group consisting of unreinforced aluminum oxide, boron carbide, silicon carbide, silicon nitride, and titanium diboride.

3. The helmet of claim 1, wherein the outer layer comprises a reinforced ceramic composited with a non-ceramic fibrous material, wherein said outer layer comprises at least about 70% ceramic by weight.

4. The helmet of claim 1, wherein the high tenacity fibers comprise polyethylene fibers having a tenacity equal to or greater than about 35 g/d.

5. The helmet of claim 1, wherein the shell further comprises a shock absorbing material layer, disposed outside the outer layer, and comprising a closed cell foam.

6. The helmet of claim 1, wherein the ceramic and the inner backing material are present in amounts, respectively, from about 30% to about 85% by weight of the shell and from about 10% to about 50% by weight of the shell.

7. The helmet of claim 1, wherein the outer layer and inner backing material each have the shape of a rounded helmet shell defining an interior volume, wherein said continuous monolith consists essentially of a ceramic, single, continuous solid piece that completely covers the inner backing material, wherein said ceramic monolith has a thickness of from about 4 mm (0.16 in) to about 6 mm (0.24 in).

8. The helmet of claim 1, wherein the shell has an areal density from about 14.7 kg/m$^2$ (3 lb/ft$^2$) to about 24.5 kg/m$^2$ (5 lb/ft$^2$).

9. The helmet of claim 1, wherein the outer layer comprises a reinforced ceramic composited with a non-ceramic, non-fibrous material, wherein said outer layer comprises at least about 70% ceramic by weight.

10. A method for forming a rounded shell for a helmet that is resistant to high energy fragments and bullets, said rounded shell comprising a crown and a peripheral surface which define an interior volume, the method comprising:
   (a) supplying, to a mold, an outer layer comprising a ceramic, an inner backing material comprising a plurality of fibrous layers, and an adhesive layer to a mold, wherein the adhesive layer is disposed between the outer layer and the inner backing material, wherein the ceramic is in the form of a continuous monolith that conforms to a curved shape of the rounded shell, or wherein the ceramic is in the form of a plurality of ceramic plates that conform to a curved shape of the rounded shell, wherein some or all of the ceramic plates have a non-planar shape; and
   (b) applying heat and pressure to the outer layer, inner backing material, and adhesive to bond the ceramic to the inner backing material and form the rounded shell.

11. A molded, rounded helmet shell prepared according to the method of claim 10, wherein said ceramic covers only a portion of said inner backing material such that only the crown of the shell or only the peripheral surface of the shell is covered by said ceramic.

12. A helmet that is resistant to high energy fragments and bullets, the helmet including a rounded shell, said shell comprising a crown and a peripheral surface which define an interior volume, and said rounded shell comprising from the outside to the inside:
   (a) an outer layer comprising a ceramic, wherein the ceramic is in the form of a plurality of ceramic plates that conform to a curved shape of the rounded shell, wherein some or all of the ceramic plates have a non-planar shape; and
   (b) an inner backing material comprising a plurality of fibrous layers, wherein the fibrous layers comprise high tenacity fibers, wherein said high tenacity fibers are optionally in a resin matrix, and wherein said high tenacity fibers comprise polyethylene fibers having a tenacity equal to or greater than about 35 g/d.

13. The helmet of claim 12, wherein adjacent ceramic plates are mechanically fitted or chemically bonded with one another at their adjacent borders, whereby the adjacent plates physically abut each other at their adjacent borders, and wherein said mechanically fitted or chemically bonded ceramic plates cover only a portion of said inner backing material.

14. The helmet of claim 12 wherein all of the ceramic plates have a non-planar shape, and wherein said ceramic plates have a substantially uniform thickness, and wherein said ceramic plates have a thickness of from about 4 mm (0.16 in) to about 6 mm (0.24 in).

15. The helmet of claim 13, wherein the outer layer and inner backing material each have the shape of a rounded helmet shell defining an interior volume, wherein the outer layer covers the inner backing material, and wherein all adjacent ceramic plates are joined with overlapping joints, thereby providing complete ceramic coverage of the inner backing material, and wherein said helmet shell has a thickness of less than about 12 mm.

16. The helmet of claim 1, wherein the outer layer and inner backing material each have the shape of a rounded helmet shell defining an interior volume, wherein said continuous monolith consists of an all ceramic, single, continuous solid piece that covers the inner backing material, thereby providing complete ceramic coverage of the inner backing material, and wherein said helmet shell has a thickness of less than about 14 mm.

17. A molded, rounded helmet shell prepared according to the method of claim 10, wherein the outer layer comprises a reinforced ceramic composited with a non-ceramic fibrous material, wherein said outer layer comprises at least about 70% ceramic by weight.

18. A molded, rounded helmet shell prepared according to the method of claim 10, wherein the fibrous layers comprise high tenacity fibers, wherein said high tenacity fibers are optionally in a resin matrix, and wherein said high tenacity fibers comprise polyethylene fibers having a tenacity equal to or greater than about 35 g/d.

19. The helmet of claim 12 wherein the fibrous layers comprise high tenacity fibers in a resin matrix, and wherein the inner backing material comprises a fabric having both warp and fill directions, said fabric having about 5.9 to about 21.6 fiber ends per cm in both said warp and fill directions.

20. The helmet of claim 12 wherein the outer layer comprises a reinforced ceramic composited with a non-ceramic fibrous material, wherein said outer layer comprises at least about 70% ceramic by weight.

* * * * *